(12) United States Patent
Zhang et al.

(10) Patent No.: US 12,344,077 B2
(45) Date of Patent: Jul. 1, 2025

(54) AIR OUTLET STRUCTURE, COLUMN, AND VEHICLE

(71) Applicant: NIO TECHNOLOGY (ANHUI) CO., LTD, Hefei (CN)

(72) Inventors: Han Zhang, Shanghai (CN); Haobin Zhang, Shanghai (CN); Tao Wang, Shanghai (CN); Jia Ge, Shanghai (CN); Guangming Tian, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 336 days.

(21) Appl. No.: 17/879,045

(22) Filed: Aug. 2, 2022

(65) Prior Publication Data

US 2023/0044225 A1 Feb. 9, 2023

(30) Foreign Application Priority Data

Aug. 6, 2021 (CN) .......................... 202110903548.7

(51) Int. Cl.
 *B60H 1/34* (2006.01)
 *B60H 1/00* (2006.01)
 B62D 25/04 (2006.01)

(52) U.S. Cl.
 CPC ....... *B60H 1/3421* (2013.01); *B60H 1/00564* (2013.01); *B62D 25/04* (2013.01)

(58) Field of Classification Search
 CPC ... B60H 1/3421; B60H 1/00564; B62D 25/04
 USPC ....................................................... 454/155
 See application file for complete search history.

(56) References Cited

U.S. PATENT DOCUMENTS

| | | | |
|---|---|---|---|
| 6,715,814 B1* | 4/2004 | Hoyle | B60H 1/00564 296/24.36 |
| 9,975,398 B2* | 5/2018 | Miyagawa | B60H 1/00764 |
| 2007/0184770 A1* | 8/2007 | Shibata | B60H 1/00564 454/69 |
| 2014/0027090 A1* | 1/2014 | Morikawa | B60H 1/00021 165/47 |
| 2017/0267065 A1* | 9/2017 | Kim | B60H 1/242 |

(Continued)

FOREIGN PATENT DOCUMENTS

CN 211281182 8/2020

*Primary Examiner* — Avinash A Savani
*Assistant Examiner* — Dana K Tighe
(74) *Attorney, Agent, or Firm* — Sheridan Ross P.C.

(57) ABSTRACT

The invention relates to an air outlet structure, a column, and a vehicle. The air outlet structure comprises: an air duct; a first air outlet and a second air outlet, the first air outlet and the second air outlet being configured to be spaced apart from each other and parallel to each other; and a first air-inducing channel and a second air-inducing channel, the first air-inducing channel extending to the first air outlet from the air duct, the second air-inducing channel extending to the second air outlet from the air duct, and the first air-inducing channel and the second air-inducing channel being configured in such a manner that a first airflow flowing out of the first air outlet and a second airflow flowing out of the second air outlet intersect and scatter each other. Through the foregoing air outlet structure, the vehicle according to the invention can expand an air supply range, significantly improve uniformity of air supply, and prevent directly blowing air to a passenger.

18 Claims, 7 Drawing Sheets

(56) References Cited

U.S. PATENT DOCUMENTS

2018/0056756 A1\* 3/2018 Schaal .................. F24F 13/10
2018/0056758 A1\* 3/2018 Salter .................... A61L 9/205
2019/0329630 A1\* 10/2019 Ren ..................... B60H 1/3414
2022/0185068 A1\* 6/2022 Miedl ............... B60H 1/00792

\* cited by examiner

AIR OUTLET STRUCTURE, COLUMN, AND VEHICLE

CROSS-REFERENCE TO RELATED APPLICATION

This application claims the benefit of China Patent Application No. 202110903548.7 filed Aug. 6, 2021, the entire contents of which is incorporated herein by reference in its entirety.

TECHNICAL FIELD

The invention relates to the field of vehicles, and particularly provides an air outlet structure, a column, and a vehicle.

BACKGROUND ART

With the improvement of people's living standards, vehicles have become an indispensable means of transportation for people's daily travel. To provide a comfortable in-vehicle environment for drivers and passengers, a ventilation system is usually arranged in a vehicle to supply air and adjust temperature according to actual requirements. The ventilation system comprises an air inlet and air vents. The air inlet is usually arranged in an upper left corner of a vehicle engine compartment and at a position close to a lower left corner of a front windshield. This position is a positive pressure area of the vehicle, and can ensure that enough air enters the vehicle. In addition, this position is relatively high, with relatively few pollutants such as vehicle exhaust gas and dust, which can also ensure quality of air entering a compartment. The air vents (or referred to as pressure relief ports or ventilation ports) are usually arranged on two sides of a vehicle trunk, below rear wheel arches or on left and right side walls. The positions are each a negative pressure area of the vehicle, with a pressure lower than that of the front of the vehicle and that inside the compartment. After the ventilation system of the vehicle is started, a fan rotates, and fresh air outside the vehicle is continuously sucked in from the air inlet. Next, fresh air enters the compartment through an air outlet arranged in the compartment along a ventilation pipe. After the air enters the compartment, the pressure in the compartment increases, which makes the air in the compartment flow out from the air vents in the negative pressure area, thereby implementing good air circulation. The ventilation system further comprises a cooling device and a heating device to regulate the air entering the compartment.

In the prior art, an air outlet of the vehicle ventilation system is usually arranged close to an instrument panel, so that the ventilation system can conveniently heat, cool and ventilate a local environment of a front row of the vehicle, and defrost a front windshield in a low temperature environment. However, most low-configuration vehicles each do not have an air outlet at a back row, resulting in uneven air output from the ventilation system and a difference between a front row temperature and a back row temperature, which greatly reduces user experience of the driver and the passenger. To solve the foregoing problems, an air outlet structure arranged on a vehicle column has been developed in the prior art. For example, Chinese utility model patent CN211281182U discloses a vehicle column and vehicle with an air outlet structure. An air duct arranged in a length direction of the column is arranged in the vehicle column, a column air outlet unit is arranged on the vehicle column to make the air duct communicate with a cabin of the vehicle, and an air door assembly capable of controlling on-off is arranged corresponding to the column air outlet unit. The air outlet structure can improve a situation of uneven air output of a back row space and a front row space of the vehicle. However, the air outlet structure outputs air through a plurality of air outlet micropores formed in the column, the air blown out from the air outlet micropores directly blows to the passenger, and an air supply range is relatively narrow.

SUMMARY OF THE INVENTION

To solve or at least improve the foregoing problems in the prior art, that is, the technical problems in the prior art that an air outlet structure of a vehicle directly blows air to a passenger and has a relatively narrow air supply range, the invention provides an air outlet structure. The air outlet structure comprises: an air duct; a first air outlet and a second air outlet, the first air outlet and the second air outlet being configured to be spaced apart from each other and parallel to each other; and a first air-inducing channel and a second air-inducing channel, the first air-inducing channel extending to the first air outlet from the air duct, the second air-inducing channel extending to the second air outlet from the air duct, and the first air-inducing channel and the second air-inducing channel being configured in such a manner that a first airflow flowing out of the first air outlet and a second airflow flowing out of the second air outlet intersect and scatter each other.

The air outlet structure according to the invention comprises the air duct, the first air outlet, the second air outlet, the first air-inducing channel, and the second air-inducing channel. The first air-inducing channel is configured to extend to the first air outlet from the air duct, the second air-inducing channel is configured to extend to the second air outlet from the air duct, and the first air-inducing channel and the second air-inducing channel are configured in such a manner that a first airflow flowing out of the first air outlet and a second airflow flowing out of the second air outlet can intersect and scatter each other. The first air outlet and the second air outlet are configured to be spaced apart from each other and parallel to each other, which enables the first airflow and the second airflow to have a larger range of scattering each other, thereby enhancing the scattering effect. It should be noted that "the first air outlet and the second air outlet are parallel to each other" here means that a center line of the first air outlet in a height (also referred to as "length") direction thereof and a center line of the second air outlet in a height (also referred to as "length") direction thereof are parallel to each other, so as to increase a common coverage range of the first airflow and the second airflow in the height or length direction of the air outlet. In a situation that the common coverage range of the first airflow and the second airflow is increased, the first airflow and the second airflow are scattered by each other, so that the air supply range can be significantly expanded, the effect of three-dimensional air supply can be implemented, and the first airflow and the second airflow can be further prevented from directly blowing air to the passenger. In addition, the arrangement of the first air-inducing channel and the second air-inducing channel can further enhance the flow guide effect on the first airflow and the second airflow and improve air supply efficiency.

In a preferred technical solution of the foregoing air outlet structure, the first air outlet and the second air outlet are slit-shaped openings. Through the configuration of the first air outlet and the second air outlet into the slit-shaped openings, the effect of hiding the air outlet can be achieved, and hidden air output is implemented.

In a preferred technical solution of the foregoing air outlet structure, aspect ratios of the first air outlet and the second air outlet are each in a range of being greater than or equal to 8. The setting of an appropriate aspect ratio enables the first air outlet and the second air outlet to have a relatively small width to meet requirements for hidden air output, and enables the first air outlet and the second air outlet to have a relatively large height (also referred to as "length"), thereby ensuring that the air outlet structure has a relatively large air outlet area and ventilation quantity.

In a preferred technical solution of the foregoing air outlet structure, the air duct comprises: a first air outlet section and a second air outlet section, the first air outlet section and the second air outlet section being spaced apart from each other and arranged side by side, the first air outlet section being provided with a first outlet that matches the first air-inducing channel, and the second air outlet section being provided with a second outlet that matches the second air-inducing channel; and an air inlet section, the air inlet section having a first air inlet section and a second air inlet section separated by a partition plate that extends in a height direction of the air inlet section, the first air inlet section communicating with the first air outlet section, and the second air inlet section communicating with the second air outlet section. The first air inlet section and first air outlet section for the first airflow to circulate and the second air inlet section and second air outlet section for the second airflow to circulate are arranged in one air duct, so that the structure of the air duct can be more compact, and an occupied space is smaller, thereby obtaining a larger ventilation quantity.

In a preferred technical solution of the foregoing air outlet structure, a first swing blade assembly extending in a height direction of the first air outlet section is formed in the first air outlet section, the first swing blade assembly comprises a plurality of first swing blades spaced apart from each other and a first connecting rod, and each of the first swing blades is configured to be rotatably attached to the first connecting rod and be capable of swinging up and down toward the first outlet; and a second swing blade assembly extending in a height direction of the second air outlet section is formed in the second air outlet section, the second swing blade assembly comprises a plurality of second swing blades that are spaced apart from each other and a second connecting rod, and each of the second swing blades is configured to be rotatably attached to the second connecting rod and be capable of swinging up and down toward the second outlet. Through the arrangement of the first swing blade assembly in the first air outlet section and the arrangement of the second swing blade assembly in the second air outlet section, the air outlet range of the first airflow and the second airflow in the height direction can be expanded, and the uniformity of air output is further improved.

In a preferred technical solution of the foregoing air outlet structure, an air valve is arranged in the air inlet section, and the air valve is configured to be capable of adjusting an air volume in the first air inlet section and an air volume in the second air inlet section. Through the arrangement of the air valve in the air inlet section, the air volume in the first air inlet section and the air volume in the second air inlet section can be conveniently adjusted, so that the air volume of the first airflow flowing out from the first air outlet section and the second airflow flowing out from the second air outlet section can be adjusted, so as to generate various combinations and obtain a more uniform air outlet effect.

To solve or at least improve the technical problems in the prior art that an air outlet structure of a vehicle directly blows air to a passenger and has a relatively narrow air supply range, the invention further provides a column. The column comprises the air outlet structure according to any one of the foregoing implementations, wherein the air outlet structure is arranged in the column; in addition, the first air outlet is located on a first longitudinal wall of the column, and the second air outlet is located on a second longitudinal wall of the column spaced apart from the first longitudinal wall. Through the use of the air outlet structure according to any one of the foregoing implementations, the column according to the invention can significantly expand the air supply range, improve uniformity of air supply, and prevent the airflow from directly blowing air to the passenger.

In a preferred technical solution of the foregoing column, the air outlet structure further comprises an air deflector, the air deflector has a first end and a second end opposite each other, the first end is configured to be spaced apart from the first longitudinal wall to form the first air-inducing channel, and the second end is configured to match the second air outlet section to form the second air-inducing channel The air deflector is provided and the first end and the second end of the air deflector are configured to match the first longitudinal wall and the second air outlet section so as to form the first air-inducing channel and the second air-inducing channel, so that the air outlet structure according to the invention can be more compact in structure and more reasonable in design.

In a preferred technical solution of the foregoing column, the first end is configured as an arc-shaped wall extending from a body of the air deflector to the first outlet in a direction away from the body, the arc-shaped wall abuts against a first inner wall of the first air outlet section close to the body, and the arc-shaped wall is spaced apart from the first longitudinal wall to form the first air-inducing channel The arc-shaped wall is configured to abut against the first inner wall of the first air outlet section close to the body of the air deflector, which can prevent the first airflow from flowing out from an assembly gap between the first air outlet section and the first end, thereby avoiding lowering air outlet efficiency. The first air-inducing channel formed by spacing the arc-shaped wall and the first longitudinal wall enables the first airflow flowing out of the first outlet to conveniently flow out from the first air outlet section, so as to improve air outlet efficiency. In addition, the arc-shaped first end matches the first longitudinal wall, so that after flowing out of the first air outlet, the first airflow can be affected by the body of the air deflector to generate the Coanda effect, and therefore flows in the direction close to the body of the air deflector, thereby further improving the flow guide effect.

In a preferred technical solution of the foregoing column, the first air outlet section has the first inner wall abutting against the first longitudinal wall extending in a horizontal direction and a first sidewall close to the second air outlet section, and the first inner wall and the first sidewall are spaced apart in a direction perpendicular to the first longitudinal wall to form the first outlet; and the first end extends in the horizontal direction and is connected to the first sidewall at the first outlet, and the first longitudinal wall is configured to be capable of covering the first outlet, so as to define the first air-inducing channel between the first end and the first longitudinal wall. The first end and the first longitudinal wall are both configured to extend in the horizontal direction to form, by spacing, the first air-inducing channel that also extends in the horizontal direction, so that the flow guide effect of the first air-inducing channel can be enhanced. In addition, more abundant products can be further obtained through the foregoing configuration.

In a preferred technical solution of the foregoing column, the second air outlet section is provided with a flow guide support that is capable of abutting against the second longitudinal wall, the flow guide support has a flow guide wall that extends obliquely toward the second longitudinal wall from the second outlet to the second air outlet, and the second end is configured to extend toward the second outlet from the body of the air deflector and be parallel to the flow guide wall to form the second air-inducing channel Through the arrangement of the second air-inducing channel, the second airflow in the second air outlet section can be guided out more conveniently, so as to improve air outlet efficiency. In addition, the second end is configured to be parallel to the flow guide wall on the second air outlet section to form the second air-inducing channel, which can further reduce wind resistance and improve the flow guide effect.

To solve or at least improve the technical problems in the prior art that an air outlet structure of a vehicle directly blows air to a passenger and has a relatively narrow air supply range, the invention further provides a vehicle. The vehicle comprises an air outlet structure according to any one of the foregoing implementations, or comprises a column according to any one of the foregoing implementations. Through the foregoing configuration, the vehicle according to the invention can significantly expand the air supply range, improve uniformity of air supply, and prevent the airflow from directly blowing air to the passenger.

Solution 1:
An air outlet structure, comprising:
an air duct;
a first air outlet and a second air outlet, the first air outlet and the second air outlet being configured to be spaced apart from each other and parallel to each other; and
a first air-inducing channel and a second air-inducing channel, the first air-inducing channel extending to the first air outlet from the air duct, the second air-inducing channel extending to the second air outlet from the air duct, and the first air-inducing channel and the second air-inducing channel being configured in such a manner that a first airflow flowing out of the first air outlet and a second airflow flowing out of the second air outlet intersect and scatter each other.

Solution 2:
The air outlet structure according to solution 1, wherein the first air outlet and the second air outlet are slit-shaped openings.

Solution 3:
The air outlet structure according to solution 2, wherein aspect ratios of the first air outlet and the second air outlet are each in a range of being greater than or equal to 8.

Solution 4:
The air outlet structure according to any one of solution 1 to 3, wherein the air duct comprises:
a first air outlet section and a second air outlet section, the first air outlet section and the second air outlet section being spaced apart from each other and arranged side by side, the first air outlet section being provided with a first outlet that matches the first air-inducing channel, and the second air outlet section being provided with a second outlet that matches the second air-inducing channel; and
an air inlet section, the air inlet section having a first air inlet section and a second air inlet section separated by a partition plate that extends in a height direction of the air inlet section, the first air inlet section communicating with the first air outlet section, and the second air inlet section communicating with the second air outlet section.

Solution 5:
The air outlet structure according to solution 4, wherein
a first swing blade assembly extending in a height direction of the first air outlet section is formed in the first air outlet section, the first swing blade assembly comprises a plurality of first swing blades spaced apart from each other and a first connecting rod, and each of the first swing blades is configured to be rotatably attached to the first connecting rod and be capable of swinging up and down toward the first outlet; and
a second swing blade assembly extending in a height direction of the second air outlet section is formed in the second air outlet section, the second swing blade assembly comprises a plurality of second swing blades that are spaced apart from each other and a second connecting rod, and each of the second swing blades is configured to be rotatably attached to the second connecting rod and be capable of swinging up and down toward the second outlet.

Solution 6:
The air outlet structure according to solution 4, wherein an air valve is arranged in the air inlet section, and the air valve is configured to be capable of adjusting an air volume in the first air inlet section and an air volume in the second air inlet section.

Solution 7:
A column, comprising an air outlet structure according to any one of solutions 1 to 6, wherein
the air outlet structure is arranged in the column; and
the first air outlet is located on a first longitudinal wall of the column, and the second air outlet is located on a second longitudinal wall of the column spaced apart from the first longitudinal wall.

Solution 8:
The column according to solution 7, wherein the air outlet structure further comprises an air deflector, the air deflector has a first end and a second end opposite each other, the first end is configured to be spaced apart from the first longitudinal wall to form the first air-inducing channel, and the second end is configured to match the second air outlet section to form the second air-inducing channel Solution 9:
The column according to solution 8, wherein the first end is configured as an arc-shaped wall extending from a body of the air deflector to the first outlet in a direction away from the body, the arc-shaped wall abuts against a first inner wall of the first air outlet section close to the body, and the arc-shaped wall is spaced apart from the first longitudinal wall to form the first air-inducing channel.

Solution 10:
The column according to solution 8, wherein
the first air outlet section has the first inner wall abutting against the first longitudinal wall extending in a horizontal direction and a first sidewall close to the second air outlet section, and the first inner wall and the first sidewall are spaced apart in a direction perpendicular to the first longitudinal wall to form the first outlet; and
the first end extends in the horizontal direction and is connected to the first sidewall at the first outlet, and the first longitudinal wall is configured to be capable of covering the first outlet, so as to define the first air-inducing channel between the first end and the first longitudinal wall.

Solution 11:

The column according to solution 8, wherein the second air outlet section is provided with a flow guide support that is capable of abutting against the second longitudinal wall, the flow guide support has a flow guide wall that extends obliquely toward the second longitudinal wall from the second outlet to the second air outlet, and the second end is configured to extend toward the second outlet from the body of the air deflector and be parallel to the flow guide wall to form the second air-inducing channel Solution 12:

A vehicle, comprising an air outlet structure according to any one of solutions 1 to 6, or comprising a column according to any one of solutions 7 to 11.

BRIEF DESCRIPTION OF THE DRAWINGS

Preferred implementations of the invention are described below with reference to drawings. Among the drawings.

LIST OF REFERENCE NUMERALS

Figure 1:
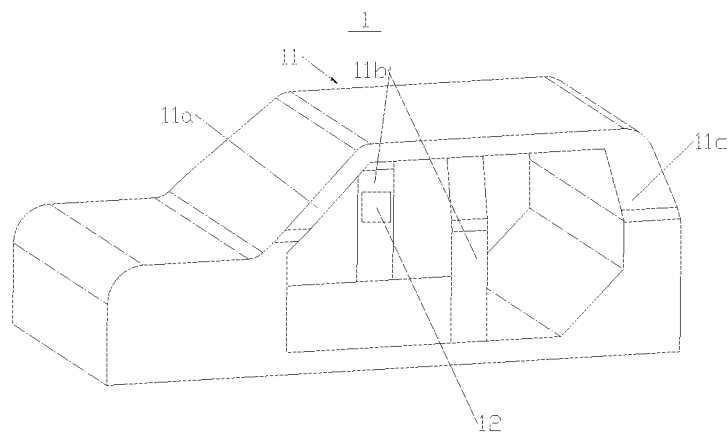
FIG. 1 is a schematic structural diagram of an embodiment of a vehicle according to the invention.

1. Vehicle; 11. Column; 11a. A column; 11b. B column; 11c. C column; 111. First longitudinal wall; 1111. Arc-shaped section; 112. Second longitudinal wall; 12. Air outlet structure; 121. Air duct; 211. First air outlet section; 2111. First outlet; 2112. First inner wall; 2113. First sidewall; 212. Second air outlet section; 2121. Second outlet; 2122. Flow guide support; 2122a. Flow guide wall; 2122b. Inclined wall; 2122c. Straight wall; 2123. Second inner wall; 213. Air inlet section; 2131. First air inlet section; 2132. Second air inlet section; 2133. Partition plate; 2134. Air valve; 21341. Blade; 21342. Rotating shaft; 2135. Air inlet; 122. First air outlet; 123. Second air outlet; 124. First air-inducing channel; 125. Second air-inducing channel; 126. Air deflector; 261. First end; 2611. Arc-shaped wall; 262. Second end; 263. Body; 127. First swing blade assembly; 271. First swing blade; 272: First connecting rod; 128. Second swing blade assembly; 281. Second swing blade; and 282: Second connecting rod.

DETAILED DESCRIPTION OF EMBODIMENTS

Preferred implementations of the invention are described below with reference to the drawings. It should be understood by those skilled in the art that these implementations are only for explaining the technical principles of the invention and are not intended to limit the scope of protection of the invention.

It should be noted that, in the description of the invention, the terms that indicate the direction or positional relationship, such as "upper", "lower", "left", "right", "inner", and "outer", are based on the direction or positional relationship shown in the figures, which is merely for ease of description instead of indicating or implying that the device or element must have a particular orientation and be constructed and operated in a particular orientation, and therefore, should not be construed as limiting the invention. Furthermore, the terms "first" and "second" are used for descriptive purposes only, and cannot be understood as indicating or implying relative importance.

In addition, it should also be noted that, in the description of the invention, the terms "arrange" and "connect" should be interpreted in a broad sense unless explicitly defined and limited otherwise. For example, a connection may be a fixed connection, a detachable connection, or an integral connection; and may be a direct connection, an indirect connection by means of an intermediary, or internal communication between two elements. For those skilled in the art, the specific meaning of the above-mentioned terms in the invention can be interpreted according to a specific situation.

To solve or at least improve the technical problems in the prior art that an air outlet structure of a vehicle directly blows air to a passenger and has a relatively narrow air supply range, the invention provides an air outlet structure 12. The air outlet structure 12 comprises: an air duct 121; a first air outlet 122 and a second air outlet 123, the first air outlet 122 and the second air outlet 123 being configured to be spaced apart from each other and parallel to each other; and a first air-inducing channel 124 and a second air-inducing channel 125, the first air-inducing channel 124 extending to the first air outlet 122 from the air duct 121, the second air-inducing channel 125 extending to the second air outlet 123 from the air duct 121, and the first air-inducing channel 124 and the second air-inducing channel 125 being configured in such a manner that a first airflow $F_1$ flowing out of the first air outlet 122 and a second airflow $F_2$ flowing out of the second air outlet 123 intersect and scatter each other.

The term "Coanda effect" mentioned herein refers to the tendency of a fluid (a water flow or an airflow, or the like) to move away from an original flow direction and instead flow along a convex object surface, unless expressly stated to the contrary. The term "aspect ratio" refers to a ratio of a dimension of an object in a height (or length) direction thereof to a dimension of the object in a width direction.

As shown in FIG. 1, in one or more embodiments, the vehicle 1 according to the invention is a car. Alternatively, the vehicle 1 according to the invention may be an SUV, an MPV, a van or another suitable vehicle. The vehicle 1 comprises a column 11. In one or more embodiments, the column 11 may be made of suitable steel by welding, hydroforming or other suitable processes, so that the column 11 has higher rigidity to achieve the effect of supporting a vehicle body structure. In one or more embodiments, one side of the column 11 close to the inside of the compartment is wrapped with a carbon fiber composite or other suitable materials, so as to achieve the effects of vibration reduction, noise reduction, vehicle body weight reduction, and the like. The column 11 comprises an A column 11a (or referred to as "front column") located in the front of the vehicle 1, a B column 11b (or referred to as "middle column") located at the middle of the vehicle 1, and a C column 11c (or referred to as "rear column") located at the rear of the vehicle 1. The A column 11a, the B column 11b and the C column 11c are arranged in a bilateral symmetry manner along a center line of the vehicle 1. As shown in FIG. 1, in one or more embodiments, an air outlet structure 12 is arranged on the B column 11b on the right side of the vehicle 1. The air outlet structure 12 is configured to communicate with a ventilation system (not shown in the figure) of the vehicle 1 through a ventilation pipeline (not shown in the figure), so that an airflow treated by the ventilation system can be conveniently conveyed through the inside of the compartment, so as to achieve objectives of ventilation and temperature regulation. Alternatively, the air outlet structure 12 may be arranged on another suitable column of the vehicle 1, such as the column 11a or the C column 11c. Alternatively, the air outlet structure 12 may be arranged at another suitable position of the vehicle 1, such as a ceiling.

A first embodiment of an air outlet structure according to the invention is described in detail below with reference to FIG. 2 to FIG. 7.

Figure 2:
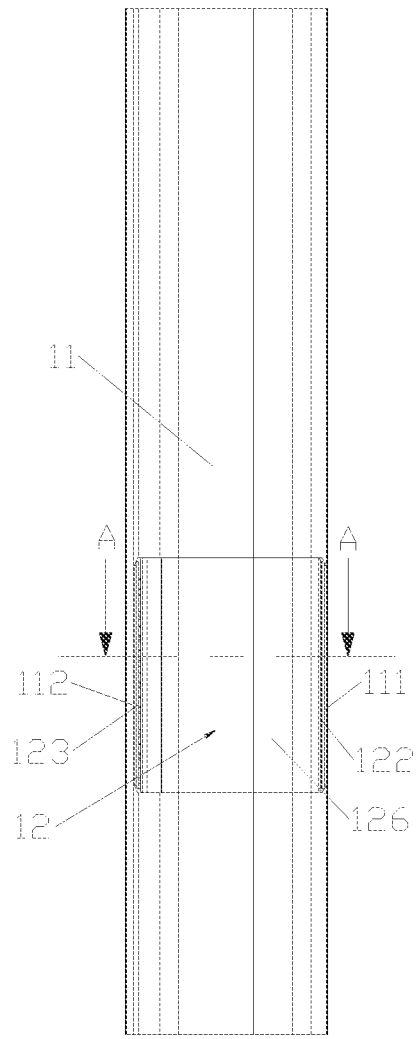
FIG. 2 is a schematic front view of a first embodiment of an air outlet structure according to the invention assembled on a column.
Figure 3:
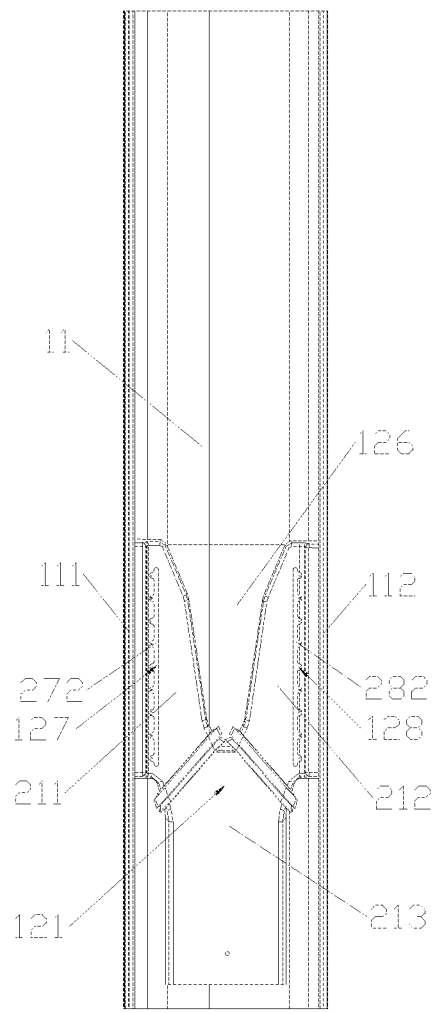
FIG. 3 is a schematic rear view of the first embodiment of an air outlet structure according to the invention assembled on a column.
Figure 4:
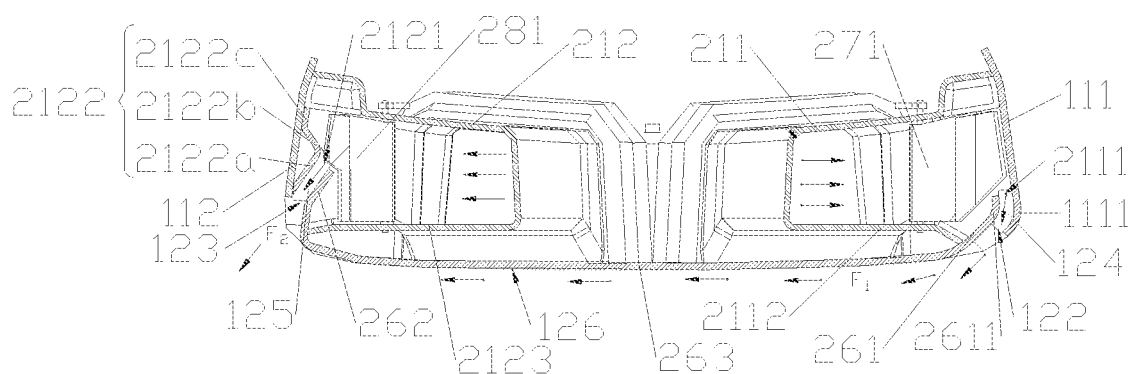
FIG. 4 is a schematic sectional view of the first embodiment of an air outlet structure according to the invention assembled on a column taken along line A-A shown in FIG. 2.

As shown in FIG. 2 to FIG. 4, in one or more embodiments, the air outlet structure 12 according to the invention comprises an air duct 121, a first air outlet 122, a second air outlet 123, a first air-inducing channel 124, a second air-inducing channel 125, and an air deflector 126. The air duct 121 is arranged in the column 11, so that the air duct 121 can be hidden inside the column 11 without being seen by a user, so as to achieve an aesthetic effect. The air duct 121 is integrally molded by injection molding by using a suitable resin material to simplify a manufacturing process and reduce a manufacturing cost. As shown in FIG. 3, in one or more embodiments, the air duct 121 comprises a first air outlet section 211, a second air outlet section 212, and an air inlet section 213. The first air outlet section 211 and the second air outlet section 212 are spaced apart from each other and arranged side by side. A first outlet 2111 capable of communicating with the first air outlet 122 is formed on the first air outlet section 211, and a second outlet 2121 capable of communicating with the second air outlet 123 is formed on the second air outlet section 212. Based on the orientation shown in FIG. 3, the first air outlet section 211 is configured to extend from an upper portion of the air inlet section 213 toward an upper left side and abut against a first longitudinal wall 111 of the column 11. Accordingly, the second air outlet section 212 is configured to extend from the upper portion of the air inlet section 213 toward an upper right side and abut against a second longitudinal wall 112 of the column 11, so that the air duct 121 is substantially in a Y shape. Through the foregoing configuration, the structure of the air duct 121 is simpler, so as to fully utilize the space in the column 11 and improve a space utilization rate. Alternatively, the first air outlet section 211 is configured to extend from the air inlet section 213 toward the upper right side and abut against the second longitudinal wall 112, and the second air outlet section 212 is configured to extend from the air inlet section 213 toward the upper left side and abut against the first longitudinal wall 111. Alternatively, the air duct 121 may be configured as two independent air ducts or other suitable forms.

As shown in FIG. 4, in one or more embodiments, the first air outlet section 211 has a first inner wall 2112 close to one side of the air deflector 126. The first inner wall 2112 is configured to abut against the air deflector 126, so as to prevent the first airflow $F_1$ from flowing out from an assembly gap between the first air outlet section 211 and the air deflector 126, thereby avoiding lowering air outlet efficiency.

Figure 6:
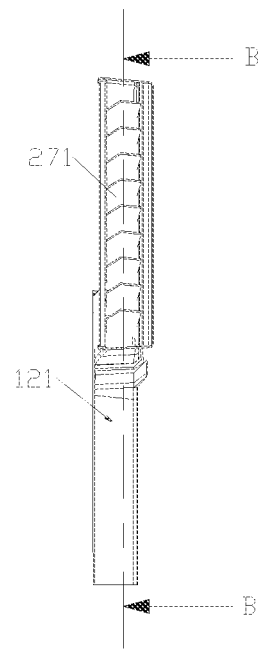
FIG. 6 is a schematic right view of the first embodiment of an air outlet structure according to the invention.
Figure 7:
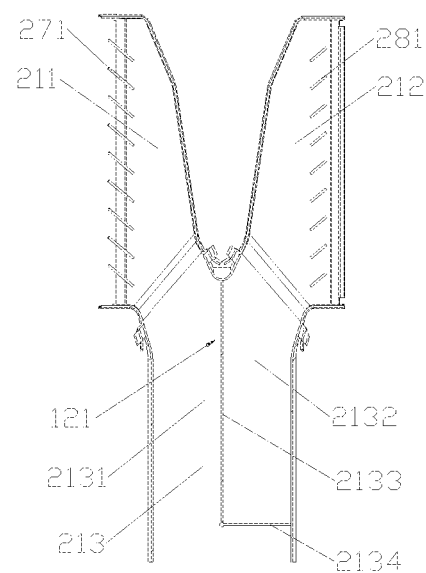
FIG. 7 is a schematic sectional view of the first embodiment of an air outlet structure according to the invention taken along line B-B shown in FIG. 6.

As shown in FIG. 3, in one or more embodiments, a first swing blade assembly 127 is further arranged in the first air outlet section 211. As shown in FIG. 3, FIG. 6 and FIG. 7, in one or more embodiments, the first swing blade assembly 127 comprises nine first swing blades 271 evenly spaced apart from each other in a vertical direction and a first connecting rod 272. Alternatively, the number of the first swing blades 271 may be set to another suitable number greater or less than nine. As shown in FIG. 4, based on the orientation shown in FIG. 4, each first swing blade 271 is configured to swing toward the right side, that is, toward the first outlet 2111. A swinging angle of the first swing blade 271 may be adjusted according to actual needs, for example, to 55°, 60°, or 65°. Each first swing blade 271 is configured to be rotatably attached to the first connecting rod 272. The first connecting rod 272 is configured to be connected to a first motor (not shown in the figure). The first motor includes, but is not limited to, a stepping motor, a servo motor, or the like. The first motor is controlled to drive the first connecting rod 272 to reciprocate in the vertical direction, so that the first swing blade 271 swings up and down, further expanding the air outlet range of the first airflow $F_1$.

As shown in FIG. 4, in one or more embodiments, the second air outlet section 212 has a second inner wall 2123 close to one side of the air deflector 126. The second inner wall 2123 is configured to abut against the air deflector 126, so as to prevent the second airflow $F_2$ from flowing out from an assembly gap between the second air outlet section 212 and the air deflector 126, thereby avoiding lowering air outlet efficiency. In one or more embodiments, the second air outlet section 212 is provided with a flow guide support 2122 abutting against the second longitudinal wall 112. The flow guide support 2122 comprises a straight wall 2122c, an inclined wall 2122b and a flow guide wall 2122a that are connected in sequence. The straight wall 2122c abuts against the second longitudinal wall 112. Based on the orientation shown in FIG. 4, the inclined wall 2122b is configured to extend from a tail end of the straight wall 2122c toward the lower right to the second outlet 2121. The flow guide wall 2122a is configured to extend from the second outlet 2121 toward the lower left to an edge of the second longitudinal wall 112.

As shown in FIG. 3, in one or more embodiments, a second swing blade assembly 128 is further arranged in the second air outlet section 212. As shown in FIG. 3, FIG. 6 and FIG. 7, in one or more embodiments, the second swing blade assembly 128 comprises nine second swing blades 281 evenly spaced apart from each other in a vertical direction and a second connecting rod 282. Alternatively, the number of the second swing blades 281 may be set to another suitable number greater or less than nine. As shown in FIG. 4, based on the orientation shown in FIG. 4, each second swing blade 281 is configured to swing toward the left side, that is, toward the second outlet 2121. A swinging angle of the second swing blade 281 may be adjusted according to actual needs, for example, to 55°, 60°, or 65°. Each second swing blade 281 is configured to be rotatably attached to the second connecting rod 282. The second connecting rod 282 is configured to be connected to a second motor (not shown in the figure). The second motor includes, but is not limited to, a stepping motor, a servo motor, or the like. The second motor is controlled to drive the second connecting rod 282 to reciprocate in the vertical direction, so that the second swing blade 281 swings up and down, further expanding the air outlet range of the second airflow $F_2$.

Figure 5:
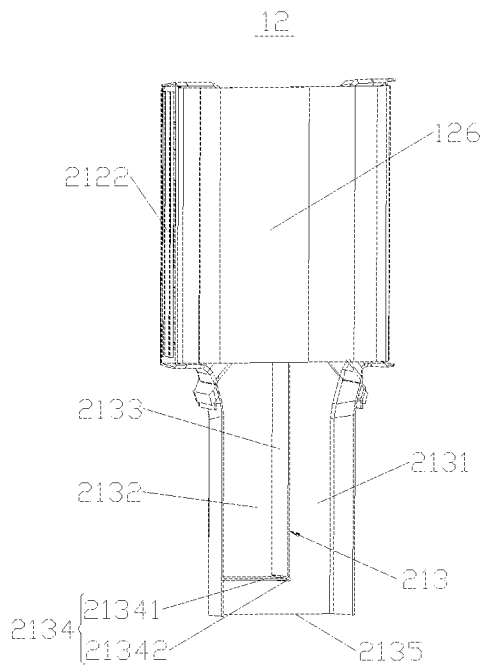
FIG. 5 is a three-dimensional schematic diagram of the first embodiment of an air outlet structure according to the invention.

As shown in FIG. 5, in one or more embodiments, the air inlet section 213 is provided with an air inlet 2135 capable of communicating with a ventilation system of the vehicle 1 so as to receive an airflow from the ventilation system. In one or more embodiments, the air inlet section 213 is further provided with a partition plate 2133 extending in a vertical direction to partition the air inlet section 213 into a first air inlet section 2131 and a second air inlet section 2132. The first air inlet section 2131 is configured to communicate with the first air outlet section 211. Accordingly, the second air inlet section 2132 is configured to communicate with the second air outlet section 212. In one or more embodiments, an air valve 2134 is arranged in the air inlet section 213 close to the air inlet 2135 to adjust an air volume in the first air inlet section 2131 and an air volume in the second air inlet section 2132. In one or more embodiments, the air valve 2134 comprises a blade 21341 and a rotating shaft 21342. The blade 21341 is configured to rotate about the rotating shaft 21342 so as to adjust an angle of the blade 21341 in the air inlet section 213. The rotating shaft 21342 is configured to be connected to a third motor (not shown in the figure), so as to control a rotation angle of the blade 21341 by driving the motor to rotate. The third motor includes, but is not limited to, a stepping motor, a servo motor, or the like.

As shown in FIG. 2, in one or more embodiments, the air deflector 126 is a single part and is arranged between the first longitudinal wall 111 and the second longitudinal wall 112 opposite each other. The air deflector 126 is formed independently of the first longitudinal wall 111 and the second longitudinal wall 112. The arrangement of the air deflector 126 can not only guide a wind direction, but also effectively shield the air duct 121, which achieves an aesthetic effect. The air deflector 126 may be integrally molded by injection molding by using PP, ABS, or another suitable resin material to simplify a manufacturing process.

As shown in FIG. 4, the air deflector 126 comprises a first end 261, a second end 262, and a body 263. The body 263 is configured as a square plate extending substantially in a horizontal direction. In one or more embodiments, the body 263 is an arc-shaped body that bulges away from the column 11, and has a predetermined radian that meets actual needs. Based on the orientation shown in FIG. 4, the first end 261 is configured to extend from a right end of the body 263 to the first outlet 2111 on the first air outlet section 211 in a direction away from the body 263, that is, to extend obliquely toward the upper right. In one or more embodiments, the first end 261 is an arc-shaped wall 2611, and the arc-shaped wall 2611 protrudes in a direction away from the first air outlet section 211. The first longitudinal wall 111 has an arc-shaped section 1111 approximately parallel to the arc-shaped wall 2611. The arc-shaped section 1111 and the arc-shaped wall 2611 are spaced apart from each other to form the first air-inducing channel 124, and a tail end of the arc-shaped section 1111 matches the arc-shaped wall 2611 to form the first air outlet 122. As shown in FIG. 2, in one or more embodiments, the first air outlet 122 is an approximately slit-shaped opening extending in the vertical direction, so that the first air outlet 122 is not easily perceived by a user, to achieve the effect of hiding the air outlet, thereby implementing hidden air output and also achieving the beautifying effect. An aspect ratio of the first air outlet 122 is in a range of being greater than or equal to 8. In one or more embodiments, the first air outlet 122 has a width of 5 mm, and the first air outlet 122 has a height of 200 mm, that is, the aspect ratio of the first air outlet 122 is 40. The setting of an appropriate aspect ratio enables the first air outlet 122 to have a smaller width to achieve the objective of hidden air output, and a larger air outlet area can be obtained to increase the air output. It can be understood that the first airflow $F_1$ conveyed to the first air outlet section 211 through the ventilation system can conveniently flow from the first outlet 2111 along the first air-inducing channel 124 and flow out from the first air outlet 122. The arrangement of the first air-inducing channel 124 can improve air outlet efficiency of the first air outlet section 211. In addition, the first airflow $F_1$ flowing out of the first air outlet 122 is affected by the air deflector 126 to generate the Coanda effect, and therefore flows in the direction close to the body 263. Specifically, as shown in the direction of the arrow in FIG. 4, the first airflow $F_1$ first flows toward the right side, and then is guided by the first air-inducing channel 124 to flow toward the left side.

As shown in FIG. 4, in one or more embodiments, the second end 262 is configured to extend from the left side of the body 263 toward the upper right to the second outlet 2121 of the second air outlet section 212. Alternatively, the second end 262 may be configured to extend from the right side of the body 263 toward the upper left to the second outlet 2121 of the second air outlet section 212, while the first end 261 is configured to extend from the left side of the body 263 toward the upper left to the first outlet 2111 of the first air outlet section 211. At this time, the positions of the first air outlet section 211 and the second air outlet section 212 are exchanged, and the positions of the first longitudinal wall 111 and the second longitudinal wall 112 are also exchanged. In one or more embodiments, a tail end of the second end 262 is configured to be substantially parallel to the flow guide wall 2122a of the flow guide support 2122, and define the second air-inducing channel 125. A tail end of the flow guide wall 2122a matches the second end 262 to form the second air outlet 123. As shown in FIG. 2, in one or more embodiments, the second air outlet 123 is an approximately slit-shaped opening extending in the vertical direction, so that a vertical center line of the second air outlet 123 is parallel to a vertical center line of the first air outlet 122. The arrangement of the slit-shaped opening enables the second air outlet 123 not to be easily perceived by the user, to achieve the effect of hiding the air outlet, thereby implementing hidden air output and also achieving the beautifying effect. An aspect ratio of the second air outlet 123 is in a range of being greater than or equal to 8. In one or more embodiments, the second air outlet 123 has a width of 5 mm, and the second air outlet 123 has a height of 200 mm, that is, the aspect ratio of the second air outlet 123 is 40. The setting of an appropriate aspect ratio enables the second air outlet 123 to have a smaller width to achieve the objective of hidden air output, and a larger air outlet area can be obtained to increase the air output. In one or more embodiments, the second air outlet 123 is configured to have the same width and height as the first air outlet 122, that is, the second air outlet 123 and the first air outlet 122 also have the same aspect ratio, so that the second air outlet 123 and the first air outlet 122 have the same air outlet area. It can be understood that the second airflow $F_2$ conveyed to the second air outlet section 212 through the ventilation system can conveniently flow from the second outlet 2121 along the second air-inducing channel 125 and flow out from the second air outlet 123. The arrangement of the second air-inducing channel 125 can improve air outlet efficiency of the second air outlet section 212. As shown in the direction of the arrow in FIG. 4, the second airflow $F_2$ flows toward the second outlet 2121 on the left side from the inside of the second air outlet section 212, and then is guided by the second air-inducing channel 125 to flow toward the lower left. At this time, the first airflow $F_1$ and the second airflow $F_2$ can intersect at a position close to the second air outlet 123 and scatter each other, which can not only improve uniformity of airflow distribution, but also expand the range of airflow distribution, and significantly improve air outlet uniformity of the air outlet structure 12.

A second embodiment of an air outlet structure according to the invention is described in detail below with reference to FIG. 8 to FIG. 13.

Figure 8:
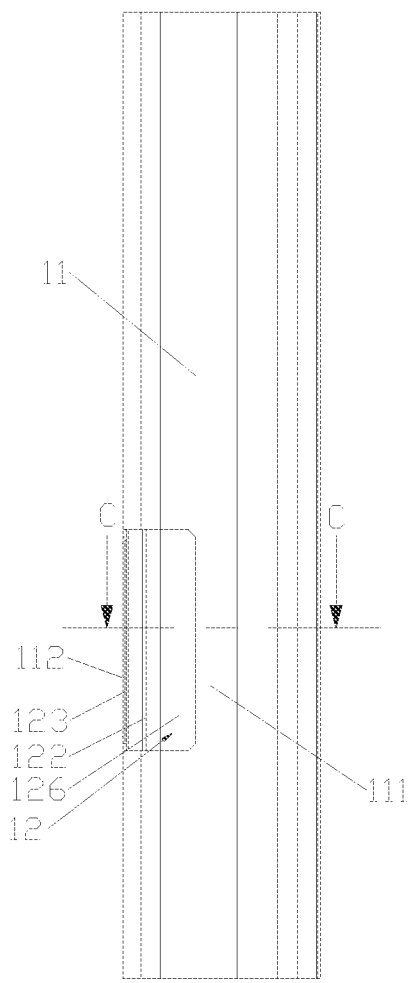
FIG. 8 is a schematic front view of a second embodiment of an air outlet structure according to the invention assembled on a column.
Figure 9:
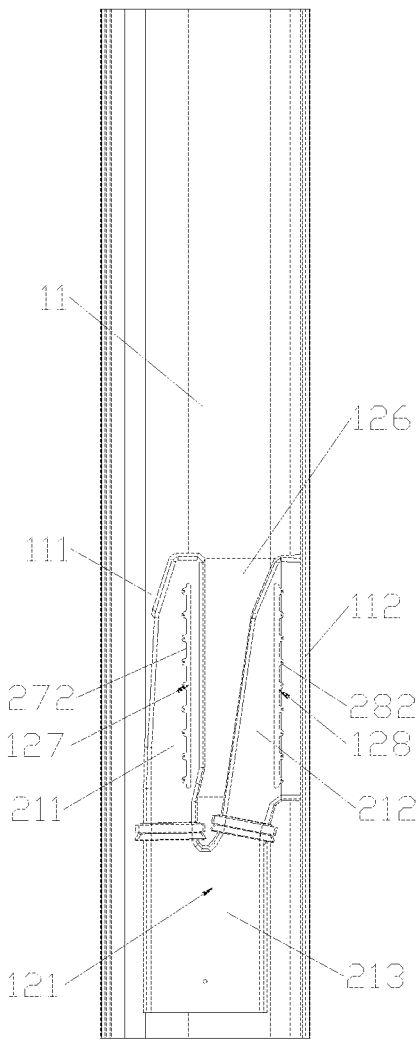
FIG. 9 is a schematic rear view of the second embodiment of an air outlet structure according to the invention assembled on a column.
Figure 10:
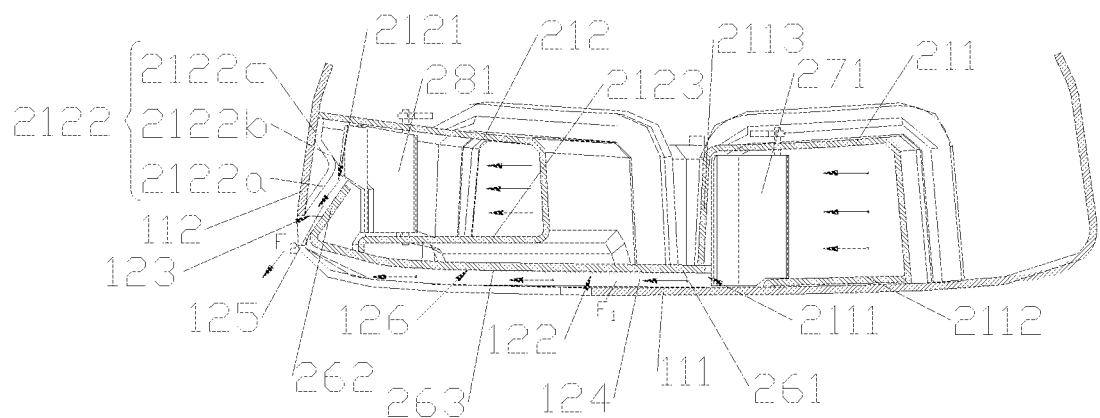
FIG. 10 is a schematic sectional view of the second embodiment of an air outlet structure according to the invention assembled on a column taken along line C-C shown in FIG. 8.

As shown in FIG. 8 to FIG. 10, in one or more embodiments, the air outlet structure 12 according to the invention comprises an air duct 121, a first air outlet 122, a second air outlet 123, a first air-inducing channel 124, a second air-inducing channel 125, and an air deflector 126. The air duct 121 comprises a first air outlet section 211, a second air outlet section 212, and an air inlet section 213. A first outlet 2111 capable of communicating with the first air outlet 122 is formed on the first air outlet section 211, and a second outlet 2121 capable of communicating with the second air outlet 123 is formed on the second air outlet section 212.

Figure 11:
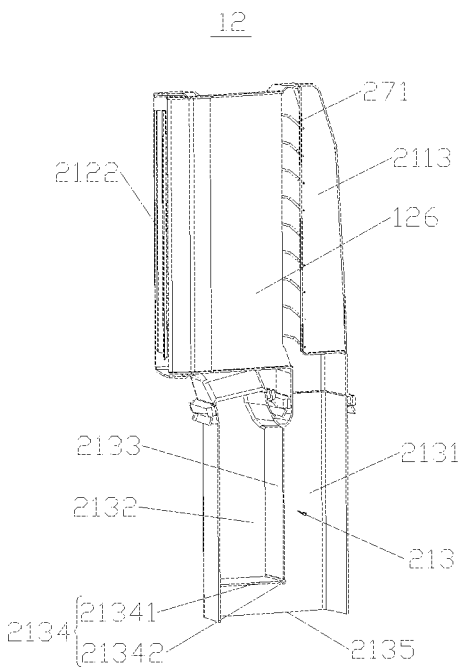
FIG. 11 is a three-dimensional schematic diagram of the second embodiment of an air outlet structure according to the invention.

Based on the orientation shown in FIG. 9, the first air outlet section 211 is configured to extend from an upper portion of the air inlet section 213 toward an upper left side and abut against a first longitudinal wall 111 of the column 11. As shown in FIG. 8, based on the orientation shown in FIG. 8, the first longitudinal wall 111 is configured to extend leftward from the right side of the column 11 substantially in the horizontal direction, and be spaced apart from the second longitudinal wall 112 located on the left side of the column 11. As shown in FIG. 10, in one or more embodiments, the first air outlet section 211 has a first inner wall 2112 abutting against the first longitudinal wall 111 and a first sidewall 2113 close to the second air outlet section 212. As shown in FIG. 10 and FIG. 11, the first inner wall 2112 and the first sidewall 2113 are spaced by a certain distance in a direction perpendicular to the first longitudinal wall 111 to form a first outlet 2111.

Figure 12:
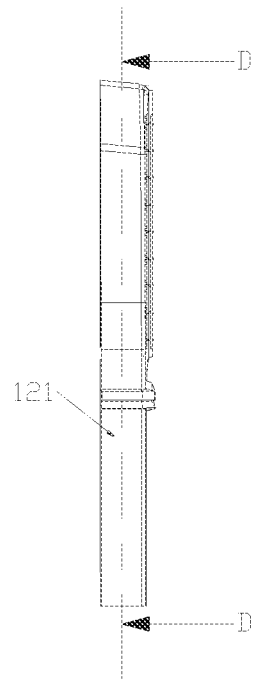
FIG. 12 is a schematic right view of the second embodiment of an air outlet structure according to the invention.
Figure 13:
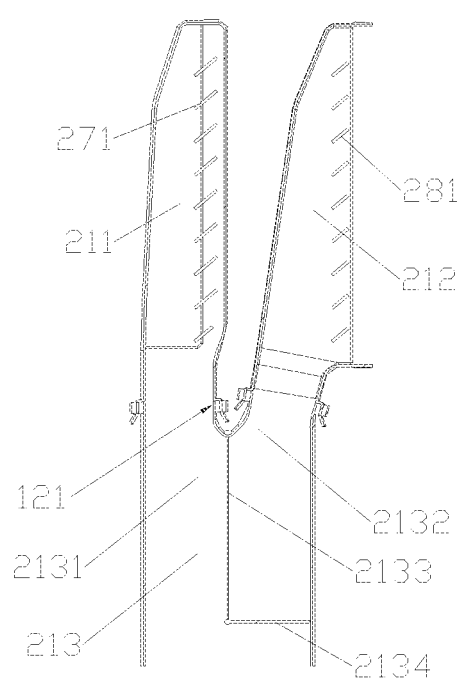
FIG. 13 is a schematic sectional view of the second embodiment of an air outlet structure according to the invention taken along line D-D shown in FIG. 11.

As shown in FIG. 9, in one or more embodiments, a first swing blade assembly 127 is further arranged in the first air outlet section 211. As shown in FIG. 9, FIG. 12 and FIG. 13, in one or more embodiments, the first swing blade assembly 127 comprises nine first swing blades 271 evenly spaced apart from each other in a vertical direction and a first connecting rod 272. Alternatively, the number of the first swing blades 271 may be set to another suitable number greater or less than nine. As shown in FIG. 10, based on the orientation shown in FIG. 10, each first swing blade 271 is configured to swing toward the left right, that is, toward the first outlet 2111.

As shown in FIG. 8, in one or more embodiments, the air deflector 126 is arranged between the first longitudinal wall 111 and the second longitudinal wall 112 that are spaced apart from each other. As shown in FIG. 10, the air deflector 126 comprises a first end 261, a second end 262, and a body 263. The body 263 is configured as a square plate extending substantially in a horizontal direction. Based on the orientation shown in FIG. 10, the first end 261 is configured to extend rightward from the body 263 to the first outlet 2111 in a substantially parallel direction and abut against the first sidewall 2113. In other words, the first end 261 and the body 263 have an integral square plate structure. As shown in FIG. 10, the first longitudinal wall 111 may cover the first outlet 2111 and extend leftward from the first outlet 2111 in a substantially horizontal direction. Therefore, the first longitudinal wall 111 and the first end 261 of the air deflector 126 are parallel to each other, and are spaced apart from each other by a predetermined distance to form the first air-inducing channel 124. At this time, the first air-inducing channel 124 also extends substantially in the horizontal direction. The predetermined distance may be 5 mm, or another suitable distance greater or less than 5 mm. At the tail end of the left side of the first longitudinal wall 111, the first longitudinal wall 111 matches the first end 261 to form the first air outlet 122. It can be understood that the first airflow $F_1$ conveyed to the first air outlet section 211 through the ventilation system can conveniently flow from the first outlet 2111 along the first air-inducing channel 124 and flow out from the first air outlet 122.

It should be noted that other parts not mentioned in the second embodiment may be configured in the same way as the first embodiment, and will not be described in detail herein.

As shown in the arrow in FIG. 10, the first airflow $F_1$ flows toward the first outlet 2111 on the left side, then is guided by the first air-inducing channel 124 to flow leftward substantially in the horizontal direction, and flows out from the first air outlet 122. The second airflow $F_2$ flows toward the second outlet 2121 on the left side from the inside of the second air outlet section 212, and then is guided by the second air-inducing channel 125 to flow toward the lower left. The first airflow $F_1$ and the second airflow $F_2$ intersect at a position close to the second air outlet 123 and scatter each other, which can not only improve uniformity of airflow distribution, but also expand the range of airflow distribution, and significantly improve air outlet uniformity of the air outlet structure 12.

Heretofore, the technical solutions of the invention have been described in conjunction with the preferred embodiments shown in the drawings, however, those skilled in the art can readily understand that the scope of protection of the invention is obviously not limited to these specific embodiments. Those skilled in the art could make equivalent changes or substitutions to the related technical features without departing from the principles of the invention, and all the technical solutions after the changes or the substitutions fall within the scope of protection of the invention.

The invention claimed is:

1. An air outlet structure, comprising:
   an air duct;
   a first air outlet and a second air outlet, the first air outlet and the second air outlet being configured to be spaced apart from each other and parallel to each other; and
   a first air-inducing channel and a second air-inducing channel, the first air-inducing channel extending to the first air outlet from the air duct, the second air-inducing channel extending to the second air outlet from the air duct, and the first air-inducing channel and the second air-inducing channel being configured in such a manner that a first airflow flowing out of the first air outlet and a second airflow flowing out of the second air outlet intersect and scatter each other, wherein the air duct comprises:

a first air outlet section and a second air outlet section, the first air outlet section and the second air outlet section being spaced apart from each other and arranged side by side, the first air outlet section being provided with a first outlet that matches the first air-inducing channel, and the second air outlet section being provided with a second outlet that matches the second air-inducing channel; and an air inlet section, the air inlet section having a first air inlet section and a second air inlet section separated by a partition plate that extends in a height direction of the air inlet section, the first air inlet section communicating with the first air outlet section, and the second air inlet section communicating with the second air outlet section, and wherein:

a first swing blade assembly extending in a height direction of the first air outlet section is formed in the first air outlet section, the first swing blade assembly comprises a plurality of first swing blades spaced apart from each other and a first connecting rod, and each of the first swing blades is configured to be rotatably attached to the first connecting rod and be capable of swinging up and down toward the first outlet; and a second swing blade assembly extending in a height direction of the second air outlet section is formed in the second air outlet section, the second swing blade assembly comprises a plurality of second swing blades that are spaced apart from each other and a second connecting rod, and each of the second swing blades is configured to be rotatably attached to the second connecting rod and be capable of swinging up and down toward the second outlet.

2. The air outlet structure according to claim 1, wherein the first air outlet and the second air outlet comprise slit-shaped openings.

3. The air outlet structure according to claim 2, wherein aspect ratios of the first air outlet and the second air outlet are greater than or equal to 8:1.

4. The air outlet structure according to claim 1, wherein an air valve is arranged in the air inlet section, and the air valve is configured to be capable of adjusting an air volume in the first air inlet section and an air volume in the second air inlet section.

5. A column, comprising:

an air outlet structure, comprising:

an air duct;

a first air outlet and a second air outlet, the first air outlet and the second air outlet being configured to be spaced apart from each other and parallel to each other; and a first air-inducing channel and a second air-inducing channel, the first air-inducing channel extending to the first air outlet from the air duct, the second air-inducing channel extending to the second air outlet from the air duct, and the first air-inducing channel and the second air-inducing channel being configured in such a manner that a first airflow flowing out of the first air outlet and a second airflow flowing out of the second air outlet intersect and scatter each other, wherein;

the air outlet structure is arranged in the column; and the first air outlet is located on a first longitudinal wall of the column, and the second air outlet is located on a second longitudinal wall of the column spaced apart from the first longitudinal wall.

6. The column according to claim 5, wherein the air duct comprises a first air outlet section and a second air outlet section, and wherein the air outlet structure further comprises an air deflector, the air deflector has a first end and a second end opposite each other, the first end is configured to be spaced apart from the first longitudinal wall to form the first air-inducing channel, and the second end is configured to match the second air outlet section to form the second air-inducing channel.

7. The column according to claim 6, wherein the first end is configured as an arc-shaped wall extending away from a body of the air deflector, the arc-shaped wall abuts against a first inner wall of the first air outlet close to the body, and the arc-shaped wall is spaced apart from the first longitudinal wall to form the first air-inducing channel.

8. The column according to claim 6, wherein;

the first air outlet section has a first inner wall abutting against the first longitudinal wall extending in a horizontal direction and a first sidewall close to the second air outlet section, and the first inner wall and the first sidewall are spaced apart in a direction perpendicular to the first longitudinal wall; and the first end extends in the horizontal direction and is connected to the first sidewall, and the first longitudinal wall defines the first air-inducing channel between the first end and the first longitudinal wall.

9. The column according to claim 6, wherein:

the second air outlet section is provided with a flow guide support that is capable of abutting against the second longitudinal wall, the flow guide support has a flow guide wall that extends obliquely toward the second longitudinal wall to the second air outlet, and the second end is configured to extend from a body of the air deflector and be parallel to the flow guide wall to form the second air-inducing channel.

10. The column according to claim 5, wherein the first air outlet and the second air outlet comprise slit-shaped openings.

11. The column according to claim 10, wherein aspect ratios of the first air outlet and the second air outlet are greater than or equal to 8:1.

12. The column according to claim 5, wherein the air duct comprises:

a first air outlet section and a second air outlet section, the first air outlet section and the second air outlet section being spaced apart from each other and arranged side by side, the first air outlet section being provided with a first outlet that matches the first air-inducing channel, and the second air outlet section being provided with a second outlet that matches the second air-inducing channel; and an air inlet section, the air inlet section having a first air inlet section and a second air inlet section separated by a partition plate that extends in a height direction of the air inlet section, the first air inlet section communicating with the first air outlet section, and the second air inlet section communicating with the second air outlet section.

13. The column according to claim 12, wherein:

a first swing blade assembly extending in a height direction of the first air outlet section is formed in the first air outlet section, the first swing blade assembly comprises a plurality of first swing blades spaced apart from each other and a first connecting rod, and each of the first swing blades is configured to be rotatably attached to the first connecting rod and be capable of swinging up and down toward the first outlet; and a second swing blade assembly extending in a height direction of the second air outlet section is formed in the second air outlet section, the second swing blade assembly comprises a plurality of second swing blades that are spaced apart from each other and a second connecting rod, and each of the second swing blades is configured to be rotatably attached to the second connecting rod and be capable of swinging up and down toward the second outlet.

14. The column according to claim 13, wherein an air valve is arranged in the air inlet section, and the air valve is configured to be capable of adjusting an air volume in the first air inlet section and an air volume in the second air inlet section.

15. A vehicle, comprising:
an air outlet structure, comprising:
an air duct;
a first air outlet and a second air outlet, the first air outlet and the second air outlet being configured to be spaced apart from each other and parallel to each other; and
a first air-inducing channel and a second air-inducing channel, the first air-inducing channel extending to the first air outlet from the air duct, the second air-inducing channel extending to the second air outlet from the air duct, and the first air-inducing channel and the second air-inducing channel being configured in such a manner that a first airflow flowing out of the first air outlet and a second airflow flowing out of the second air outlet intersect and scatter each other,
wherein the air duct comprises:
a first air outlet section and a second air outlet section, the first air outlet section and the second air outlet section being spaced apart from each other and arranged side by side, the first air outlet section being provided with a first outlet that matches the first air-inducing channel, and the second air outlet section being provided with a second outlet that matches the second air-inducing channel; and
an air inlet section, the air inlet section having a first air inlet section and a second air inlet section separated by a partition plate that extends in a height direction of the air inlet section, the first air inlet section communicating with the first air outlet section, and the second air inlet section communicating with the second air outlet section, and
wherein:
a first swing blade assembly extending in a height direction of the first air outlet section is formed in the first air outlet section, the first swing blade assembly comprises a plurality of first swing blades spaced apart from each other and a first connecting rod, and each of the first swing blades is configured to be rotatably attached to the first connecting rod and be capable of swinging up and down toward the first outlet; and
a second swing blade assembly extending in a height direction of the second air outlet section is formed in the second air outlet section, the second swing blade assembly comprises a plurality of second swing blades that are spaced apart from each other and a second connecting rod, and each of the second swing blades is configured to be rotatably attached to the second connecting rod and be capable of swinging up and down toward the second outlet.

16. The vehicle according to claim 15, wherein the first air outlet and the second air outlet comprise slit-shaped openings.

17. The vehicle according to claim 16, wherein aspect ratios of the first air outlet and the second air outlet greater than or equal to 8:1.

18. The vehicle according to claim 15, wherein an air valve is arranged in the air inlet section, and the air valve is configured to be capable of adjusting an air volume in the first air inlet section and an air volume in the second air inlet section.

\* \* \* \* \*